United States Patent [19]
Di Nocco et al.

[11] 4,447,252
[45] May 8, 1984

[54] APPARATUS FOR CURVING AND TEMPERING OR HEAT TOUGHENING THIN GLASS SHEETS

[75] Inventors: Dino Di Nocco, Vasto; Nicola Delle Donne, Casalbordino, both of Italy

[73] Assignee: Società Italiana Vetro - SIV - S.p.A., Italy

[21] Appl. No.: 362,131

[22] Filed: Mar. 26, 1982

[30] Foreign Application Priority Data

Apr. 6, 1981 [IT] Italy ............................... 20938 A/81

[51] Int. Cl.$^3$ ........................................... C03B 23/023
[52] U.S. Cl. ....................................... 65/268; 65/104; 65/273; 65/287
[58] Field of Search .................. 65/104, 268, 273, 287

[56] References Cited

U.S. PATENT DOCUMENTS

| | | | |
|---|---|---|---|
| 1,620,017 | 3/1927 | Halbach et al. | 65/104 |
| 3,315,774 | 4/1967 | Leflet, Jr. | 65/104 |
| 3,529,947 | 9/1970 | Frank | 65/104 |
| 3846104 | 11/1974 | Seymour | 65/104 |
| 3,846,106 | 11/1974 | Seymour | 65/104 X |
| 4,092,141 | 5/1978 | Frank et al. | 65/104 X |
| 4,187,095 | 2/1980 | Frank | 65/104 |
| 4,339,259 | 7/1982 | Paudice et al. | 65/273 X |

FOREIGN PATENT DOCUMENTS 2400296 1/1974 Fed. Rep. of Germany .

*Primary Examiner*—Arthur D. Kellogg
*Attorney, Agent, or Firm*—Wenderoth, Lind & Ponack

[57] ABSTRACT

An apparatus is provided for curving and tempering or heat toughening thin glass sheets, with thickness less than 4 mm and with camber over 60 mm, regardless of the type of curve described by their profile (cylindrical, parabolic, etc.). A continuous feed system is provided for curving rings, such system including a horizontal carrousel which permits individual curving rings to pass under a forming station every 3 seconds. Rolls are provided in the curve forming station designed to pass across the curving ring or forming mould, regardless of the camber of the latter, even if it exceeds 60 mm, as the rolls are not secured to the rings. The carrousel includes the combination of two racks or horizontal chain conveyors with two pairs of roller conveyors. Means are provided for the rapid lowering and subsequent unloading of the glass sheet, so that during its heating in a furnace and after an unloading phase, the glass sheet is located at a higher level with respect to the path it follows in the curve forming and in quenching stations.

4 Claims, 3 Drawing Figures

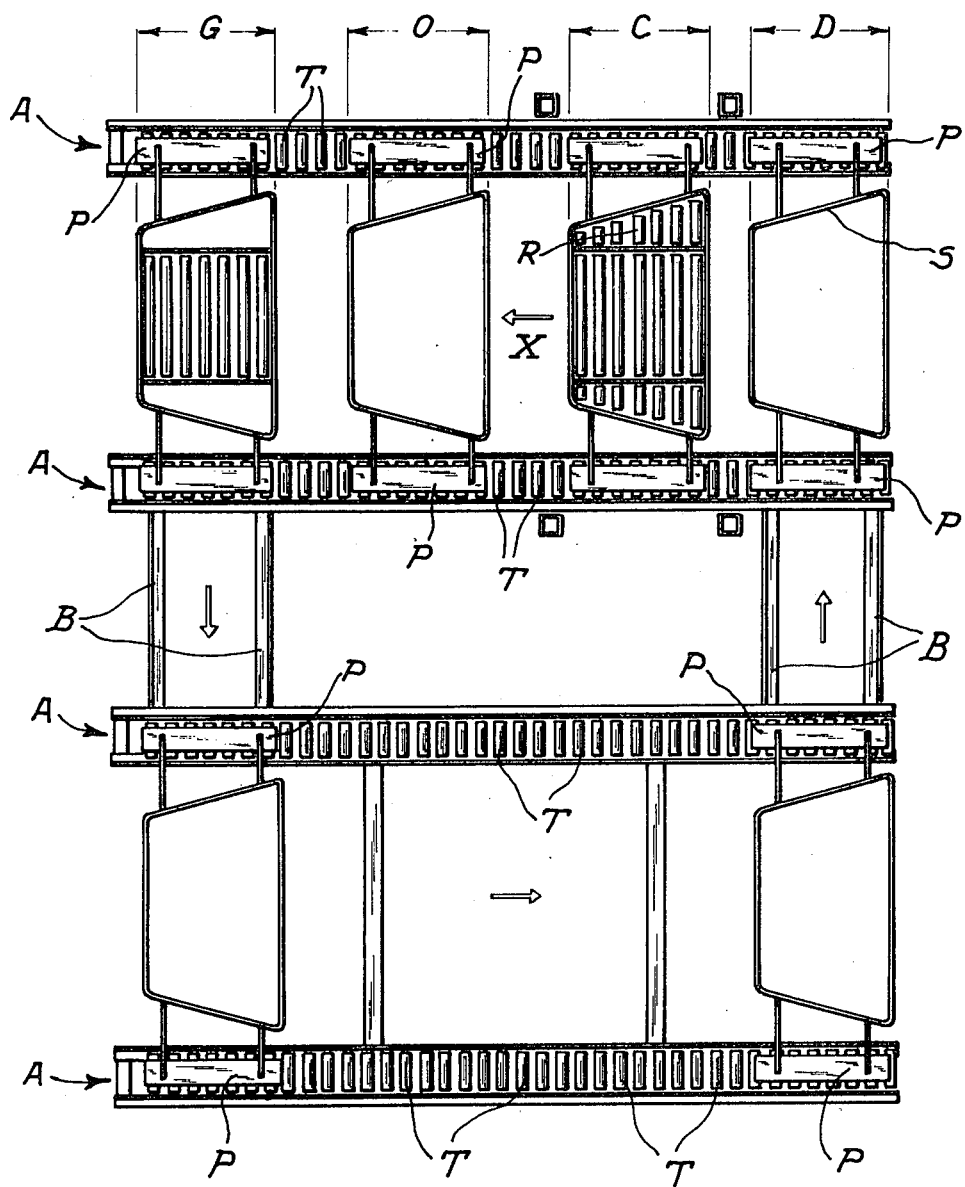

APPARATUS FOR CURVING AND TEMPERING OR HEAT TOUGHENING THIN GLASS SHEETS

BACKGROUND OF THE INVENTION

The present invention relates to an apparatus for curving and tempering or heat toughening thin glass sheets.

Such products are frequently used as windows for vehicles in general, and more especially for automobiles.

Such application requires that the windows be made accurately complying with imposed tolerances and sizes, as well as with the configuration associated with the lines of the particular vehicle.

Furthermore, the clarity of vision through these windows must not be impeded by optical distorsion or by defects in the glass.

The heat treatment confers increased resistance to impact and guarantees that glass fragments produced in the event of breakage are less damaging than those which would have been produced in nontoughened glass.

As is already known, tempered or toughened glass sheets, more especially those used in the automobile industry, can also be manufactured by equipment having a horizontal layout which permits a high production output.

In these types of equipment, each glass sheet is conveyed horizontally through a continuous furnace in which it is heated to the softening temperature. The glass sheet is next transferred to a forming station if it is to be curved, then to the quenching station, followed by cooling.

For efficient tempering of the glass sheet, it must still retain a certain degree of plasticity after forming.

On the other hand, such conditions of plasticity can inevitably give rise to modification in the shape assumed by the glass prior to the forming station, owing to its own weight, as well as to the inertia of the glass sheet, to the action of the first blasts of quenching air and to possible asymmetrical cooling between the top and bottom faces of the glass sheet.

As is already known, the thinner is the glass sheet, the greater are the deformations, since if it is true that its own weight and its inertia decrease in proportion to the thickness of the sheet, it is also true, however, that resistance to deformation decreases with the cube of the glass sheet thickness.

The deformation effect of the quenching blasts is more strongly noticable in thinner glass sheets.

During the last few years, considerable commercial importance has been attached to the manufacture of curved and tempered glass sheets of increasingly less thickness, ranging from 5–6.5 mm down to 2.5–4 mm.

As a result, the manufacturing process has been affected by this reduction in thickness since resistance to deformation decreases—as already stated—by the cube of the thickness.

The increase of quenching blasts, required for the higher thermal gradient associated with the thinner glass sheets, in turn contributes, with the lower structural strength, in making it more difficult to control the shape of the product which, after the forming phase, is still in the plastic state.

The apparatuses already known in the prior art have been gradually modified to improve the curving and tempering or heat toughening process.

However, only the apparatus in accordance with the present invention, is able to satisfy the requirements associated with ever closer tolerances and with products of different curvature from a cylindrical profile.

Also well known in the prior art concerning glass sheets conveyed on rollers in a heating furnace is, for example, the U.S. Pat. No. 3,338,695 (to Ritter) which describes a process as well as an apparatus for curving and tempering glass sheets, especially suitable for glass sheets from 4 to 6 mm thick.

In French Pat. No. 1.474.251 (to LOF) means are provided for the first time for curving the glass sheet utilizing the gravity and pressure of a mould, by providing a mould on which the glass sheet to be curved is placed, so that forming is performed as accurately as possible.

In U.S. Pat. No. 3,684,473 (to Ritter) a process and apparatus are described for tempering or heat toughening glass sheets 3.2 to 2.4 mm thick, by using a so-called curving for "inertia and gravity" process and a device which supports the glass sheet while it is submitted to the action of the quenching blasts.

Lastly, in Patent LU No. 65.146 (to Ritter) a process and apparatus are described for tempering or toughening thin glass sheets, that is, less than 4 mm thick, by using the curving by "inertia and gravity" process; furthermore, quenching of the glass sheet is already started in the curve forming station by providing special nozzles which cool the glass while it is still in the curving ring.

The systems of the patents of the prior art are not, however, able to provide means which ensure curving and tempering or toughening of parts with cambers over 60 mm and at the same time with thicknesses less than 4 mm, such as rear windows for motor vehicles.

In fact, U.S. Pat. No. 3,338,695 (to Ritter) is not able to provide curved and tempered glas sheets with cambers over 60 mm, because the configuration of the conveyor rolls (see FIGS. 3 and 7) shows that the forming ring cannot travel down lower than the axis of such rolls, as these rolls are secured at their ends.

Yet again, with French Pat. No. 1.474.251 (to LOF) it is not possible to curve, with reasonable accuracy, glass sheets less than 4 mm thick; this is because a thin sheet, resting on a mould (as illustrated in FIG. 4), tends to curve during heating, in a marked manner along its axis parallel to the longitudinal axis of the furnace, owing to the effect of decreased resistance to deformation due to its thinness.

This inevitably makes it difficult to control the curving process, thereby resulting in failure to hold the work tolerances.

U.S. Pat. No. 3,684,473 (to Ritter) cannot even be applied for manufacturing parts whose cambers exceeds 60 mm because the utilization of the curving for "inertia and gravity" system leads to curving times increased more than those obtained by pressing. Such increase of time, estimated to be about 2 seconds more, is in contrast with the pressing need associated with thin sheets, to minimize the total time required for transferring the glass sheet from the heating furnace to the quenching blasts.

Lastly, in Patent LU No. 65.146 (to Ritter) there is provision for starting the quenching phase in the curve forming station; therefore it involves a process which is applicable with decisively negative results on strongly curved parts because such arrangement of the blowers produces a very uneven "pre-quenching" on the parts, hence it is difficult to achieve the required standards of quality.

Furthermore, the use of mechanical means to stop the glass sheet can lead to the formation of marks on the glass sheet with consequent impairing of the optical quality of the finished product.

SUMMARY OF THE INVENTION

An object of the present invention is to provide, as already stated, an apparatus for curving and tempering or toughening thin glass sheets, including sheets less than 4 mm thick, with cambers exceeding 60 mm, independently of the type of curve described by their profile (cylindrical, parabolic etc.).

A second object of the present invention is also to appreciably reduce the transfer times from the heating furnace to the quenching blasts, thereby overcoming all the difficulties disclosed in the prior art.

These objects have been achieved by using roller conveyors which carry the glass sheets in the curve forming station and in the unloading station, such conveyors being arranged to pass by the curving rings as they are being fed one by one. Consequently it is possible to permit any camber of the glass sheet. (See patent application submitted by the same applicant No. 27967 A/79 dated Dec. 7, 1979.

Moreover, electronic means are used for "seeing" and stopping the glass sheets, instead of the mechanical stops as used in the past which were liable to cause damage to the glass surface.

Above all, however, means are used for the rapid lowering of the rolls and of the glass sheets resting on such rolls in the forming zone so as to convey the glass sheets up to the curving rings. Analogous means are also provided for the rapid lifting of the rolls and of the glass sheets in the unloading zone.

Lastly, a continuous feed system for the curving rings is adopted, consisting of a horizontal carrousel.

These improvements permit the various curving rings used in the work cycle to be positioned in an equidistant manner, every 3 seconds under the curve forming station.

The present invention will be better understood in conjunction with the following description of a preferred embodiment of the invention which is illustrated only as an exemplification of the principles of the invention in the accompanying drawings, with no limitation to be inferred.

BRIEF DESCRIPTION OF THE DRAWINGS

In these drawings:

FIG. 3 is a plan view of a curving ring feed and return carrousel thereof.

DETAILED DESCRIPTION OF THE INVENTION

Figure 1:
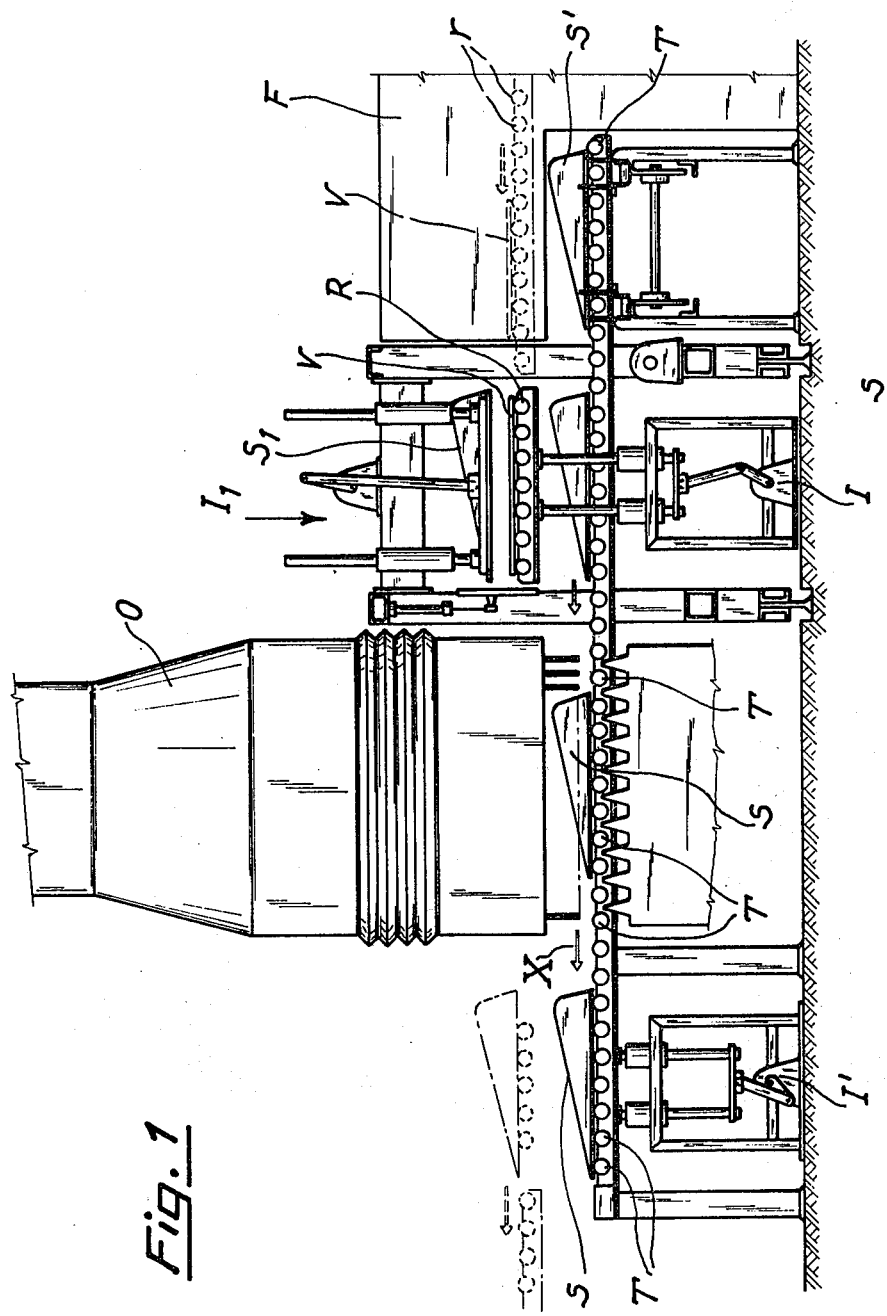
FIG. 1 is a longitudinal section of the entire apparatus in accordance with the invention.
Figure 2:
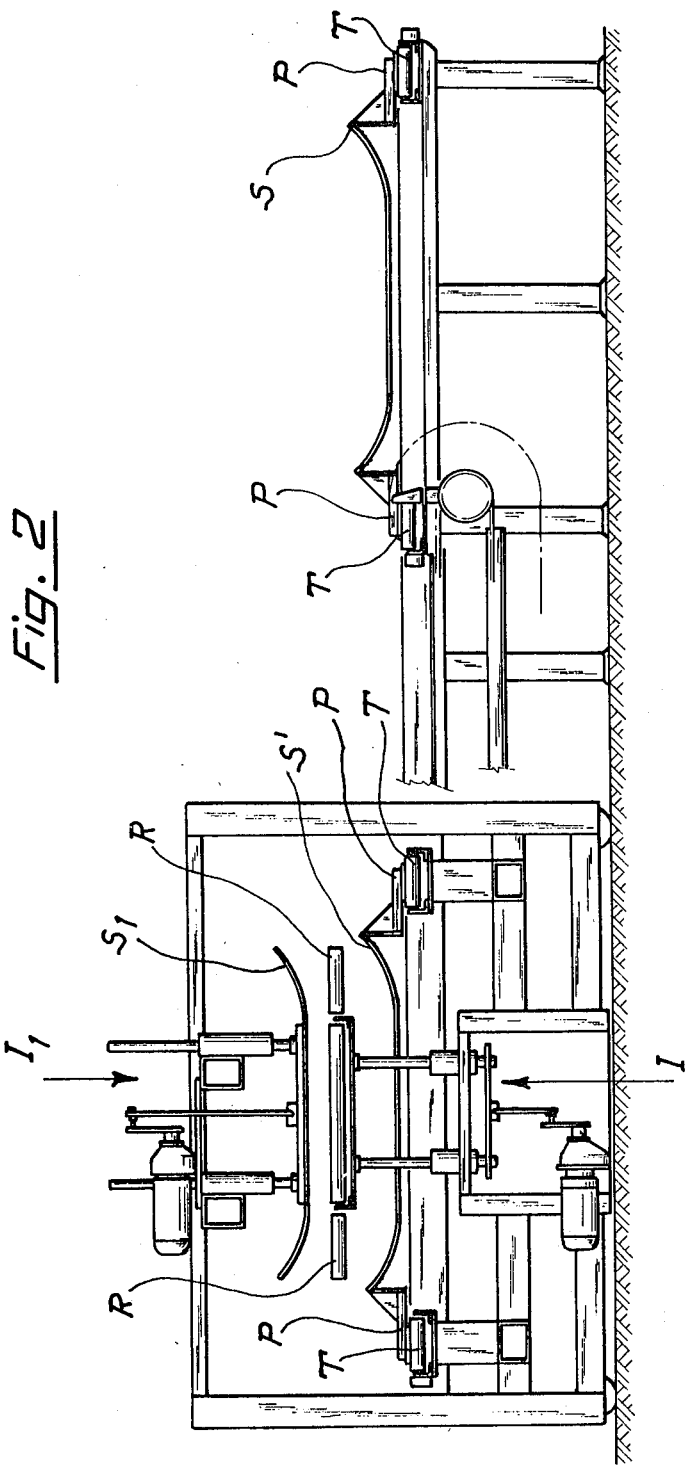
FIG. 2 is a cross section of the apparatus.

As can be seen in the drawings, in an installation using the appartus in accordance with the invention, glass sheet V travels through a continuous heating furnace F, either electric or gas-fired, the glass sheet being moved on conveyor rolls r shown in dotted outline in FIG. 1 and heated until reaching a temperature approaching that of the softening point which is about 650° C.

The glass sheet V emerges from furnace F and engages roller conveyor or assembly R on which it continues its travel until stopping in a perfectly aligned position with respect to a curve forming system.

Such perfect alignment is preferably achieved by means of an electronic control system (not illustrated in the drawings), which uses a laser ray to detect passage of the glass sheet and which sends a signal to another electronic device of the "closed loop" type.

Thanks to this system, it is possible to eliminate the use of mechanical stops which would cause damage to the surface of the glass sheets (as stated previously) because, when passing from movement to the stop position, there would be relative motion between the glass and the conveyor rolls.

Once the glass sheet V is stopped, the roller conveyor R is lowered by rod and crank hydraulic system I and, as it is not secured at its sides, it deposits glass sheet V on a ring-shaped mould S. Conveyor R continues its downward traverse until the axis of its rolls is aligned with the axis of rolls T on which rest pads P of mould S.

At this point, mould S is free to move crosswise in the installation according to the direction indicated by arrow X (see FIGS. 1 and 3).

Simultaneous to the lowering of roller conveyor R, a press unit, consisting of a hydraulic pressing system $I_1$ and an upper mould $S_1$ (supplementary to the curving ring-shape mould S), is also lowered.

The function of such unit is to press the glass sheet V on mould S so as to form it into the desired shape in the least possible time.

In other words, the pressing of the glass sheet takes places some fraction of a second after the glass sheet has been rested on mould S.

After pressing, mould $S_1$ is immediately raised and once it reaches the minimum height necessary to retract it from ring-shaped mould S, the latter springs forward to bring, as stated, glass sheet V under the quenching blowers O.

With the above described apparatus, the total time needed to transfer glass sheet V from furnace F to the quenching blowers O, passing through a curve forming zone C, is no greater than 3 seconds (instead of the 4 or more seconds needed previously).

This permits a minimum, but not harmful, dispersion of heat in order to accomplish quenching in accordance with the desired standards of quality.

During the transfer of the curving ring-shaped mould S towards the quenching blowers O, a new curving ring-shaped mould S' is conveyed to the curve forming zone C where, as soon as it is stopped, it is passed through by roller conveyor or assembly R which is then lifted in position ready to receive the next glass sheet V to be curved.

In order to carry out this operation, which must take place very quickly within about 3 seconds, there is provided a "carrousel" for curving ring-shaped moulds S, S' etc. which travel along a horizontal path, and whose number varies from 5 to 9 according to the size of the installation.

Such "carrousel" consists of two pairs of longitudinal roller conveyors A and two pairs of transverse chain conveyors B which are interconnected as illustrated in FIG. 3 and on which the curving rings or moulds S are conveyed at variable speeds according to the required times for the various phases making up the process.

The work stations consecutively occupied by moulds S are subdivided into starting or parking (D), curve forming (C), quenching (O), unloading (G).

The return to parking station (D) is performed at the maximum possible speed.

We claim:

1. An apparatus for curving and tempering or heat toughening thin glass sheets, said apparatus including generally horizontally arranged starting, curve forming, quenching and unloading zones, said apparatus comprising:

a plurality of generally ring-shaped molds mounted for horizontal movement between said zones;

a vertically movable first roller assembly located at said curve forming zone;

means, located at said curve forming zone, for rapidly lowering said first roller assembly from an upper position, whereat said first roller assembly is positioned to receive and support a glass sheet to be curved, to a lower position, whereat the glass sheet supported by said first roller assembly is transferred to a said ring-shaped mold located at said curve forming zone;

an upper mold located at said curve forming zone;

means, positioned at said curve forming zone, for, when said glass sheet is transferred to said ring-shaped mold at said curve forming zone, moving said upper mold downwardly to cooperate with said ring-shaped mold to curve said glass sheet;

a vertically movable second roller assembly located at said unloading zone;

means, located at said unloading zone, for raising said second roller assembly between lower and upper positions thereof to thereby unload a glass sheet from a said ring-shaped mold at said unloading zone; and carrousel means for transferring sequentially said plurality of ring-shaped molds in an endless horizontal path, such that said glass sheet supported by said ring-shaped mold at said curve forming zone is transferred sequentially from said curve forming zone to said quenching zone and then to said unloading zone, whereat said glass sheet is unloaded, and then the thus unloaded ring-shaped mold is transferred from said unloading zone to said starting zone and then back to said curve forming zone to receive a new glass sheet to be curved.

2. An apparatus as claimed in claim 1, wherein said carrousel means comprises a first pair longitudinal conveyors for movement of said ring-shaped molds in a first direction, a second pair of longitudinal conveyors for movement of said ring-shaped molds in a second direction opposite to said first direction, first transverse conveyor means for moving said ring-shaped molds from said pair of longitudinal conveyors at said unloading zone to said second pair of longitudinal conveyors, and second transverse conveyor means for moving said ring-shaped molds from said second pair of longitudinal conveyors to said first pair of longitudinal conveyors at said starting zone.

3. An apparatus as claimed in claim 1, wherein said lowering means is constructed to pass through the said ring-shaped mold located at said curve forming zone, and also is operable, after a new said ring-shaped mold is positioned at said curve forming zone, to return said first roller assembly from said lower position thereof to said upper position thereof.

4. An apparatus as claimed in claim 1, wherein said lowering means and said raising means each comprise hydraulic assemblies.

* * * * *